(12) United States Patent
Movshovich et al.

(10) Patent No.: US 11,770,619 B2
(45) Date of Patent: *Sep. 26, 2023

(54) GENERATING STATIC IMAGES WITH AN EVENT CAMERA

(71) Applicant: Apple Inc., Cupertino, CA (US)

(72) Inventors: Aleksandr M. Movshovich, Santa Clara, CA (US); Arthur Yasheng Zhang, San Jose, CA (US)

(73) Assignee: APPLE INC., Cupertino, CA (US)

( * ) Notice: Subject to any disclaimer, the term of this patent is extended or adjusted under 35 U.S.C. 154(b) by 79 days.

This patent is subject to a terminal disclaimer.

(21) Appl. No.: 17/235,175

(22) Filed: Apr. 20, 2021

(65) Prior Publication Data

US 2021/0243347 A1    Aug. 5, 2021

Related U.S. Application Data (63) Continuation of application No. 16/649,005, filed as application No. PCT/US2018/039933 on Jun. 28, 2018, now Pat. No. 11,019,273.

(Continued)

(51) Int. Cl.
*H04N 23/72* (2023.01)
*H04N 23/71* (2023.01)

(52) U.S. Cl.
CPC ............ *H04N 23/72* (2023.01); *H04N 23/71* (2023.01)

(58) Field of Classification Search
CPC .... H04N 5/232; H04N 5/2351; H04N 5/2352; H04N 5/2354; H04N 5/2621;

(Continued)

(56) References Cited

U.S. PATENT DOCUMENTS

| 7,817,914 B2 | 10/2010 | Kuberka et al. |
| 8,654,848 B2 | 2/2014 | Tian et al. |

(Continued)

FOREIGN PATENT DOCUMENTS

| CN | 103516946 A | 1/2014 |
| CN | 104272723 A | 1/2015 |

(Continued)

OTHER PUBLICATIONS

CNIPA First Office Action dated Aug. 25, 2021, Chinese Application No. 201880062981.9, pp. 1-34 (Including English Translation).

(Continued)

*Primary Examiner* — Chiawei Chen
(74) *Attorney, Agent, or Firm* — Fernando & Partners, LLP (57) ABSTRACT

In accordance with some embodiments, a method is performed at an image processing device with a processor and non-transitory memory. The method includes triggering light emission, over a first emission duration, having a characterizing intensity as a function of time. The method further includes obtaining respective pixel events, from an event camera, corresponding to reflections of the light emission during the first emission duration, each respective pixel event corresponding to a breach of a respective comparator threshold indicative of a brightness level, each respective pixel event characterized by a respective electrical threshold value and a timestamp at which the respective electrical threshold value was breached. The method also includes generating a static image by determining a plurality of luminance estimation values from the respective pixel events, wherein the plurality of luminance estimation values respectively correspond to an amount of reflected light received by portions of the event camera.

20 Claims, 8 Drawing Sheets

Related U.S. Application Data (60) Provisional application No. 62/564,823, filed on Sep. 28, 2017.

(58) Field of Classification Search
CPC ........ H04N 23/72; H04N 23/71; H04N 23/60; H04N 23/74; G01T 1/20; G01T 1/249; G01T 1/2985
See application file for complete search history.

(56) References Cited

U.S. PATENT DOCUMENTS

| | | | |
|---|---|---|---|
| 10,373,357 B2* | 8/2019 | Woo | G06F 3/017 |
| 11,019,273 B2* | 5/2021 | Movshovich | H04N 5/2351 |
| RE48,780 E * | 10/2021 | Lee | G06T 7/20 |
| 11,227,397 B2* | 1/2022 | Delbruck | G06T 7/269 |
| 2004/0026623 A1* | 2/2004 | Doty | H04N 5/3415 |
| | | | 348/E3.02 |
| 2006/0192086 A1* | 8/2006 | Niclass | H01L 31/107 |
| | | | 257/E31.063 |
| 2011/0147599 A1* | 6/2011 | Grobshtein | G01T 1/249 |
| | | | 250/371 |
| 2012/0081567 A1 | 4/2012 | Cote et al. | |
| 2013/0207007 A1* | 8/2013 | Tanabe | G02B 21/008 |
| | | | 250/573 |
| 2013/0335595 A1 | 12/2013 | Lee et al. | |
| 2014/0326854 A1* | 11/2014 | Delbruck | G01J 1/44 |
| | | | 250/204 |
| 2015/0069218 A1* | 3/2015 | Cho | G01S 17/00 |
| | | | 250/208.1 |
| 2015/0248551 A1* | 9/2015 | Bae | G06F 21/36 |
| | | | 726/30 |
| 2015/0319369 A1* | 11/2015 | Serrano Gotarredona | |
| | | | H04N 25/778 |
| | | | 250/208.1 |
| 2016/0011321 A1* | 1/2016 | Solf | G01T 1/1606 |
| | | | 250/369 |
| 2016/0088287 A1 | 3/2016 | Sadi et al. | |
| 2016/0093273 A1* | 3/2016 | Wang | G01S 3/781 |
| | | | 345/428 |
| 2016/0203614 A1* | 7/2016 | Wang | G06V 10/147 |
| | | | 382/103 |
| 2016/0300374 A1* | 10/2016 | Woo | G06F 3/042 |
| 2016/0320834 A1* | 11/2016 | Lee | G06F 3/012 |
| 2017/0124410 A1* | 5/2017 | Cho | G06V 10/22 |
| 2017/0150021 A1 | 5/2017 | Lee | |
| 2017/0264364 A1 | 9/2017 | Aoyama et al. | |
| 2018/0070020 A1* | 3/2018 | Rotte | H04N 5/2351 |
| 2018/0295298 A1* | 10/2018 | Zamir | H04N 5/3535 |
| 2019/0052820 A1 | 2/2019 | Berner | |
| 2019/0102641 A1* | 4/2019 | Zink | G06N 3/063 |
| 2019/0332167 A1* | 10/2019 | Chenegros | A61F 9/08 |
| 2020/0018592 A1* | 1/2020 | Narasimhan | G03B 15/02 |
| 2020/0027237 A1* | 1/2020 | Baumgartner | G06V 10/82 |
| 2020/0284575 A1* | 9/2020 | Yao | H04N 5/2353 |

FOREIGN PATENT DOCUMENTS

| | | |
|---|---|---|
| CN | 105844659 A | 8/2016 |
| CN | 106095262 A | 11/2016 |
| CN | 106597463 A | 4/2017 |
| CN | 107534738 A | 1/2018 |
| GB | 2510891 A | 8/2014 |
| WO | 2016178712 A1 | 11/2016 |

OTHER PUBLICATIONS

Severin Loock et al., "Impact of Image Brightness Reduction on Perceived Quality of 3D Experience for 3D Cinema Spectators," 2016 International Conference on 3D Imaging (IC3D), IEEE, 2016, pp. 1-4.

Notification to Grant Patent Right dated Jan. 13, 2022, Chinese Application No. 201880062981.9, pp. 1-6 (Including English Translation of Reference Cited).

D. Bronzi et al., "100 00 Frames/s 64×32 Single-Photon Detector Array for 2-D Imaging and 3-D Ranging", IEEE Journal of Selected Topics in Quantum Electronics,IEEE Service Center, vol. 20, No. 6, Nov./Dec. 2014, pp. 1-10.

R. Lussana et al., "Enhanced Single-Photon Time-Of-Flight 3D Ranging", Optics Expressway, Sep. 15, 2015, pp. 1-12.

International Search Report and Written Opinion of corresponding Intl. App. No. PCT/US2018/039933 dated Sep. 19, 2018, pp. 1-11.

Preliminary Rejection for corresponding Korean Patent Appl. No. 10-2022-7035688 dated Jun. 16, 2023.

* cited by examiner

GENERATING STATIC IMAGES WITH AN EVENT CAMERA

CROSS-REFERENCE TO RELATED APPLICATIONS

This application is a continuation of U.S. patent application Ser. No. 16/649,005, filed on Mar. 19, 2020, which is a national stage entry of Intl. Patent App. No. PCT/US2018/039933, filed on Jun. 28, 2018, which claims priority to U.S. Provisional Patent App. No. 62/564,823, filed on Sep. 28, 2017, which are all hereby incorporated by reference in their entirety.

TECHNICAL FIELD

The present disclosure relates generally to the field of digital image processing, and more specifically to generating static images with an event camera.

BACKGROUND

Traditional cameras use clocked image sensors to acquire visual information from a scene. Such methods are time-quantized at a certain frame rate. Each frame of data that is recorded is typically post-processed in some manner. In many traditional cameras, each frame of data carries information from all pixels. Carrying information from all pixels often leads to redundancy, and the redundancy typically increases as the amount of dynamic content in a scene increases. As image sensors utilize higher spatial and/or temporal resolution, the amount of data included in a frame will most likely increase. Frames with more data typically require additional hardware with increased capacitance, which tends to increase complexity, cost, and/or power consumption. When the post-processing is performed at a battery-powered mobile device, post-processing frames with significantly more data usually drains the battery of the mobile device much faster.

SUMMARY

The present disclosure utilizes event camera sensors ("event cameras", hereinafter for the sake of brevity) to generate static images. In some embodiments, an event camera generates event image data in response to detecting a change in its field of view. In some embodiments, an event camera indicates changes in individual pixels. For example, the output of an event camera includes pixel-level brightness changes (e.g., instead of standard intensity frames). In some embodiments, the output generation of an event camera is event-controlled. As such, the event camera outputs data in response to detecting a change in its field of view. For example, the event camera outputs data in response to detecting a change in a scene that is in the field of view of the event camera. In some embodiments, an event camera includes pixel event sensors that detect changes in individual pixels thereby allowing individual pixels to operate autonomously. Pixels that do not register changes in their intensity produce no data. As a result, pixels that correspond to static objects (e.g., objects that are not moving) do not trigger an output by the pixel event sensor, whereas pixels that correspond to variable objects (e.g., objects that are moving) trigger an output by the pixel event sensor. In other words, a data stream provided by a pixel event sensor indicates pixels that correspond to the moving objects. Unlike traditional cameras that output gray-level information in response to detecting a homogenous surface or a motionless background, an event camera does not produce data when the field of view includes a homogeneous surface or a motionless background.

The present disclosure provides systems, devices, and/or methods for generating high resolution static images with an event camera. In accordance with some embodiments, systems and methods described herein trigger a controlled light source (e.g., a flash or a strobe) to emit light. The reflections of the light are received by the event camera and time-stamped pixel events are outputted. The pixel events are sent to a luminance estimator, which generates a plurality of luminance estimation values by fitting the timestamped pixel events to curves corresponding to the characterization of the controlled light source. A static image is then formed by arranging the plurality of luminance estimation values. Systems and methods according to the embodiments described herein thus effectively increase the resolution of static images produced by event cameras.

In accordance with some embodiments, a device includes a flash controller, an event camera, and an image processor. The flash controller is connectable to a controllable light source to provide a control signal to the controllable light source in order to drive the controllable light source to emit light over a first emission duration as a function of the control signal. The event camera has a plurality of pixel elements arranged to receive reflections of the light emitted by the controllable light source during the first emission duration. In some embodiments, each of the plurality of pixel elements outputs a respective pixel event in response to a breach of a comparator threshold indicative of a brightness level. In some embodiments, each event is characterized by a respective electrical threshold value and a timestamp at which the respective electrical threshold value was breached. The image processor then generates a static image from the respective pixel events received from the event camera. In some embodiments, the image processor includes a luminance estimator to generate a plurality of luminance estimation values from the respective pixel events that respectively correspond to an amount of reflected light received by the corresponding plurality of pixel elements, and the static image includes a corresponding arrangement of the plurality of luminance estimation values.

In accordance with some embodiments, a method is performed at an image processing device with a processor and non-transitory memory. The method incudes triggering light emission, over a first emission duration, having a characterizing intensity as a function of time. The method further includes obtaining respective pixel events, from an event camera, corresponding to reflections of the light emission during the first emission duration, each respective pixel event corresponding to a breach of a respective comparator threshold indicative of a brightness level, each respective pixel event characterized by a respective electrical threshold value and a timestamp at which the respective electrical threshold value was breached. The method also includes generating a static image by determining a plurality of luminance estimation values from the respective pixel events, wherein the plurality of luminance estimation values respectively correspond to an amount of reflected light received by portions of the event camera.

In accordance with some embodiments, a device includes one or more processors, non-transitory memory, and one or more programs. The one or more programs are stored in the non-transitory memory, and are executable by the one or more processors. The one or more programs include instructions for performing or causing performance of the operations of any of the methods described herein. In accordance with some embodiments, a non-transitory computer readable storage medium has stored therein instructions that, when executed by one or more processors of a device, cause the device to perform or cause performance of the operations of any of the methods described herein. In accordance with some implementations, a device includes means for performing or causing performance of the operations of any of the methods described herein.

BRIEF DESCRIPTION OF THE DRAWINGS

For a better understanding of the various described embodiments, reference should be made to the Description below, in conjunction with the following drawings in which like reference numerals refer to corresponding parts throughout the figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Figure 1:
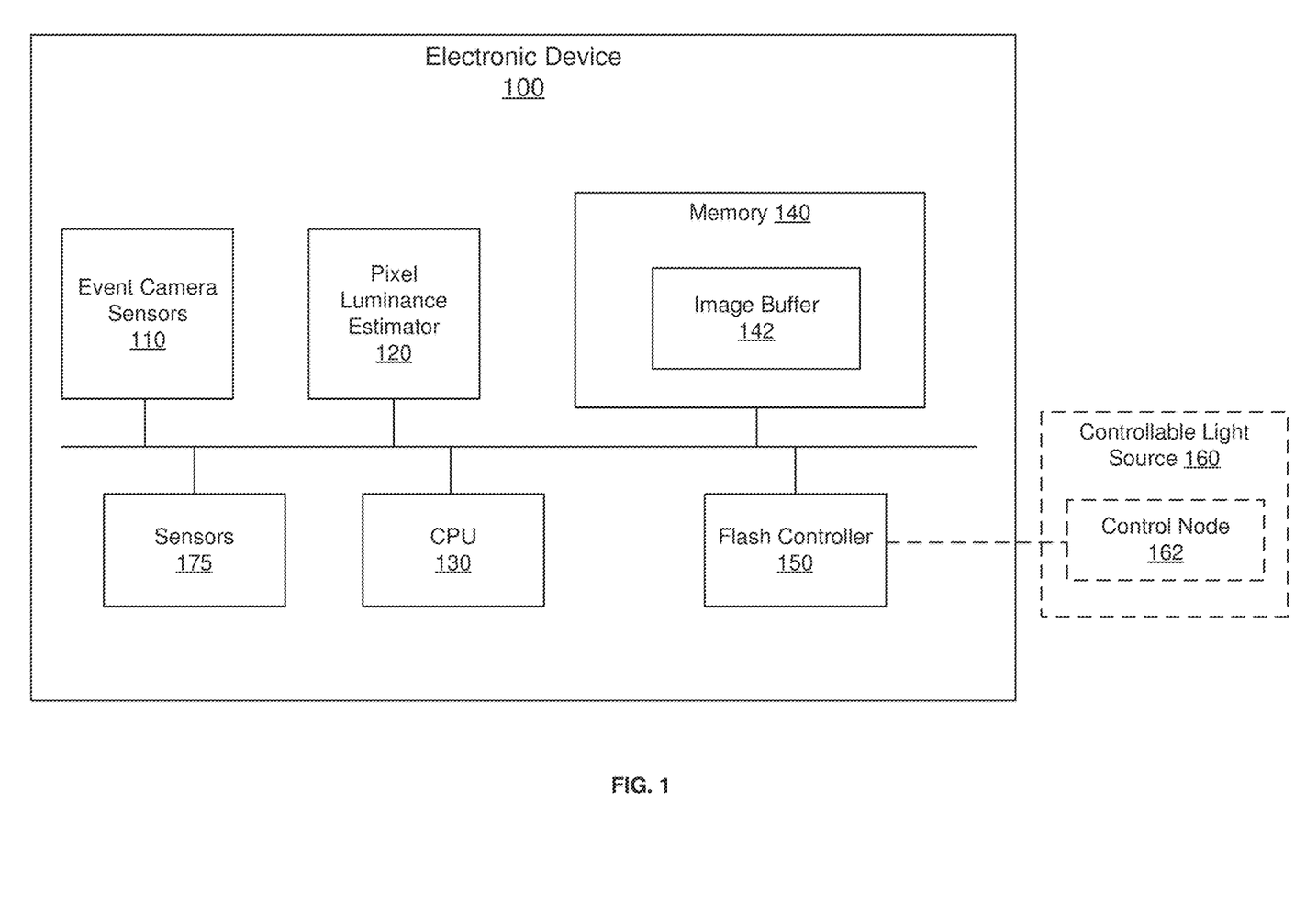
FIG. 1 is a block diagram illustrating an example electronic device, in accordance with some embodiments.

Referring to FIG. 1, a block diagram of an example electronic device 100 is depicted, in accordance with some embodiments. In some embodiments, the electronic device 100 is part of a multifunctional device, such as a mobile phone, tablet computer, personal digital assistant, portable music/video player, wearable device, or any other electronic device that includes an image processing device. Though not shown in FIG. 1, in some embodiments, the electronic device 100 is connected to other devices across a network, such as other mobile devices, tablet devices, desktop devices, as well as network storage devices, including servers and the like.

In some embodiments, the electronic device 100 includes a central processing unit (CPU) 130 and device sensors 175 (e.g., proximity sensor/ambient light sensor, accelerometer and/or gyroscope etc.). The processor 130 is a system-on-chip in accordance with some embodiments, such as the system-on-chip found in mobile devices, and includes one or more dedicated graphics processing units (GPUs). Further, in some embodiments, the processor 130 includes multiple processors of the same type or different types.

In some embodiments, the electronic device 100 includes a memory 140. The memory 140 includes one or more types of memory used for performing device functions in conjunction with the processor 130. In some embodiments, the memory 140 includes cache, ROM, and/or RAM. In some embodiments, the memory 140 stores various programming modules during execution. In some embodiments, the memory 140 serves as a buffer 142 for storing one or more images during in-line image processing. In some embodiments, the memory 140 stores computer-readable instructions that are executable by the CPU 130.

Figure 2:
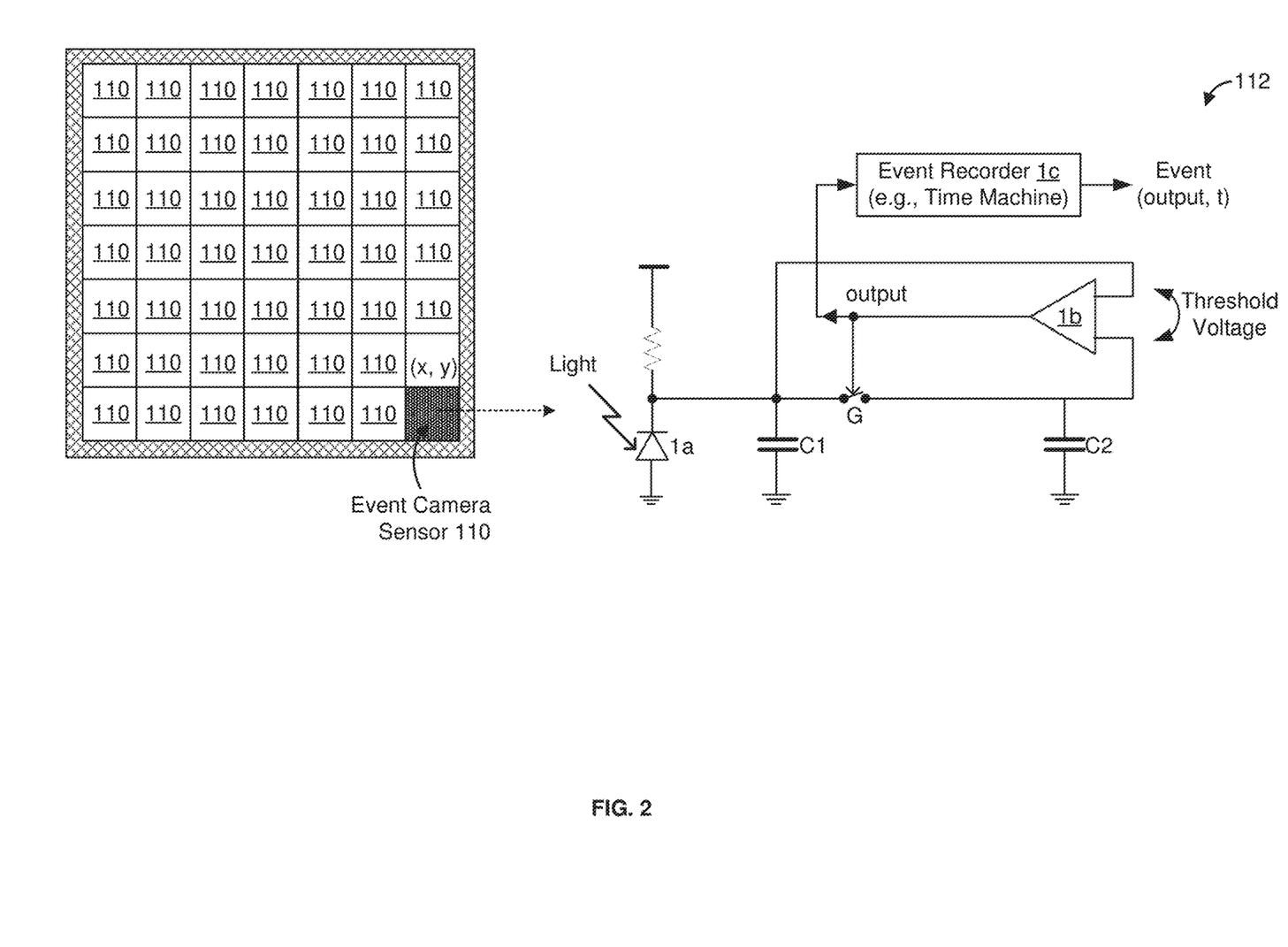
FIG. 2 is a block diagram of event camera sensors and an example circuit diagram of an event camera sensor, in accordance with some embodiments.

In some embodiments, the electronic device 100 includes one or more cameras, including an event camera (e.g., event camera sensors 110, for example, pixel sensors or pixel elements). As shown in FIG. 2, in some embodiments, the event camera sensors 110 are distributed across an operable area of the event camera. As described herein, in some embodiments, an event camera sensor 110 identifies a change in brightness (e.g., intensity) at a given pixel and records an event when the change in brightness is identified.

In some embodiments, the electronic device 100 includes a flash controller 150. The flash controller 150 provides a control signal to a controllable light source 160 in order to drive a controllable light source 160 to emit light. As indicated by the dotted line, in some embodiments, the controllable light source 160 is internal to the electronic device 100 (e.g., the controllable light source 160 is a part of the electronic device 100). In some embodiments, the controllable light source 160 is external to the electronic device 100 (e.g., the controllable light source 160 is outside the electronic device 100). In some embodiments, the controllable light source 160 is coupled to the flash controller 150 or is an integral part of the electronic device 100. In some embodiments, the controllable light source 160 is external to the electronic device 100 and is connectable to the flash controller 150 (e.g., the controllable light source 160 is slid into the electronic device 100 to be connected to the electronic device 100 via a wired connection or wirelessly). In some embodiments, the controllable light source 160 includes a control node 162, which receives a control signal provided by the flash controller 150 and drives the controllable light source 160 to emit light as a function of the control signal.

In some embodiments, the electronic device 100 includes a pixel luminance estimator 120. The pixel luminance estimator 120 calculates luminance estimation values based on pixel events outputted by the event camera sensor(s) 110 and synthesizes static images using the luminance estimation values. In some embodiments, the synthesized static images are then stored in the image buffer 142.

FIG. 2 is a block diagram of the event camera sensors 110 and an example circuit diagram of an exemplary event camera sensor 110, in accordance with some embodiments. As illustrated in FIG. 2, in some embodiments, the event camera sensors 110 are arranged in a two-dimensional array and distributed across an operable area of an event camera. In the example of FIG. 2, each event camera sensor 110 has a two-dimensional coordinate (X, Y) as an address identifier. In some embodiments, each of the event camera sensor 110 is an integrated circuit.

FIG. 2 illustrates an example circuit diagram of a circuit 112 (e.g., an integrated circuit) for an event camera sensor 110 (e.g., a pixel element). In the example of FIG. 2, the circuit 112 includes various circuit elements including a photodiode 1a, capacitors C1 and C2, a gate G, a comparator 1b, and an event recorder 1c (e.g., a time machine). In some embodiments, the photodiode 1a generates a photocurrent in response to detecting a threshold change in light intensity at a pixel. In some embodiments, the photodiode 1a is integrated into the capacitor C1. When the gate G is closed, current begins to flow, and the capacitor C1 begins to accumulate charge. In some embodiments, the comparator 1b compares an electrical voltage across C1 with a previous voltage across capacitor C2. If the comparison result satisfies a comparator threshold, the comparator 1b outputs an electrical response to the event recorder 1c. In some embodiments, the electrical response is a voltage. In such embodiments, the voltage of the electrical response is indicative of the brightness of reflected light. In some embodiments, the event recorder 1c, labels each output as an event with an event timestamp. As such, changes in photodiode illumination at each pixel element are detected and outputted as events, and the timestamps associated with the events are recorded.

Figure 3:
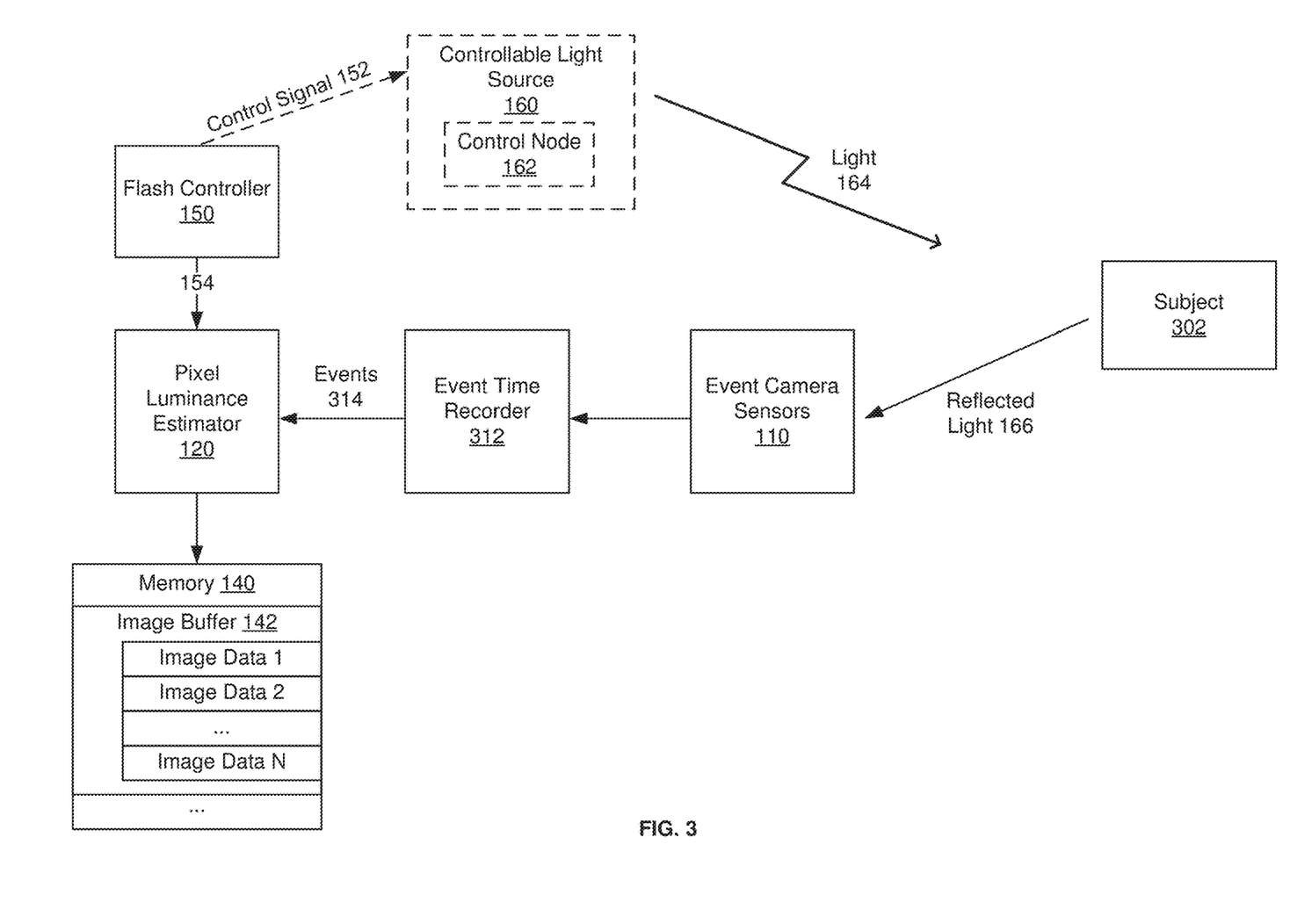
FIG. 3 is a flow diagram illustrating image generation with an event camera, in accordance with some embodiments.

FIG. 3 illustrates a flowchart of generating static image(s) using the electronic device 100, in accordance with some embodiments. In some embodiments, the process begins with the flash controller 150 of the electronic device 100 providing a control signal 152 to the controllable light source 160 (e.g., a flash or a strobe). In some embodiments, the controllable light source 160 emits light 164 (e.g., light rays) in response to receiving the control signal 152. As illustrated in FIG. 3, the light rays hit a subject 302 and illuminates the scene containing the subject 302. In some embodiments, reflected light 166 (e.g., a portion of the light 164 reflected by the subject 302) is detected by the event camera sensors 110 and events are generated (e.g., as described herein with reference to FIG. 2). The event time recorder 312 (e.g., the event recorder 1c shown in FIG. 2) generates (e.g., labels) events 314 with timestamps and the timestamped events 314 are provided to the pixel luminance estimator 120 as inputs. The pixel luminance estimator 120 also receives an input 154 from the flash controller 150 describing a characterization of the control signal 152 effecting the emission of light, e.g., light bursts as a step function or increasing flash intensity as a ramp function. Based on the input 154, the pixel luminance estimator 120 determines luminance estimation values. In some embodiments, the pixel luminance estimator 120 determines the luminance estimation values by utilizing a curve fitting process (e.g., as described herein with reference to FIGS. 4-5). In some embodiments, the electronic device 100 synthesizes static images based on the luminance estimation values. In some embodiments, the electronic device 100 stores the synthesized static images in the memory 140 (e.g., as image data 1, image data 2 . . . image data N in an image buffer 142 of the memory 140).

Figure 4:
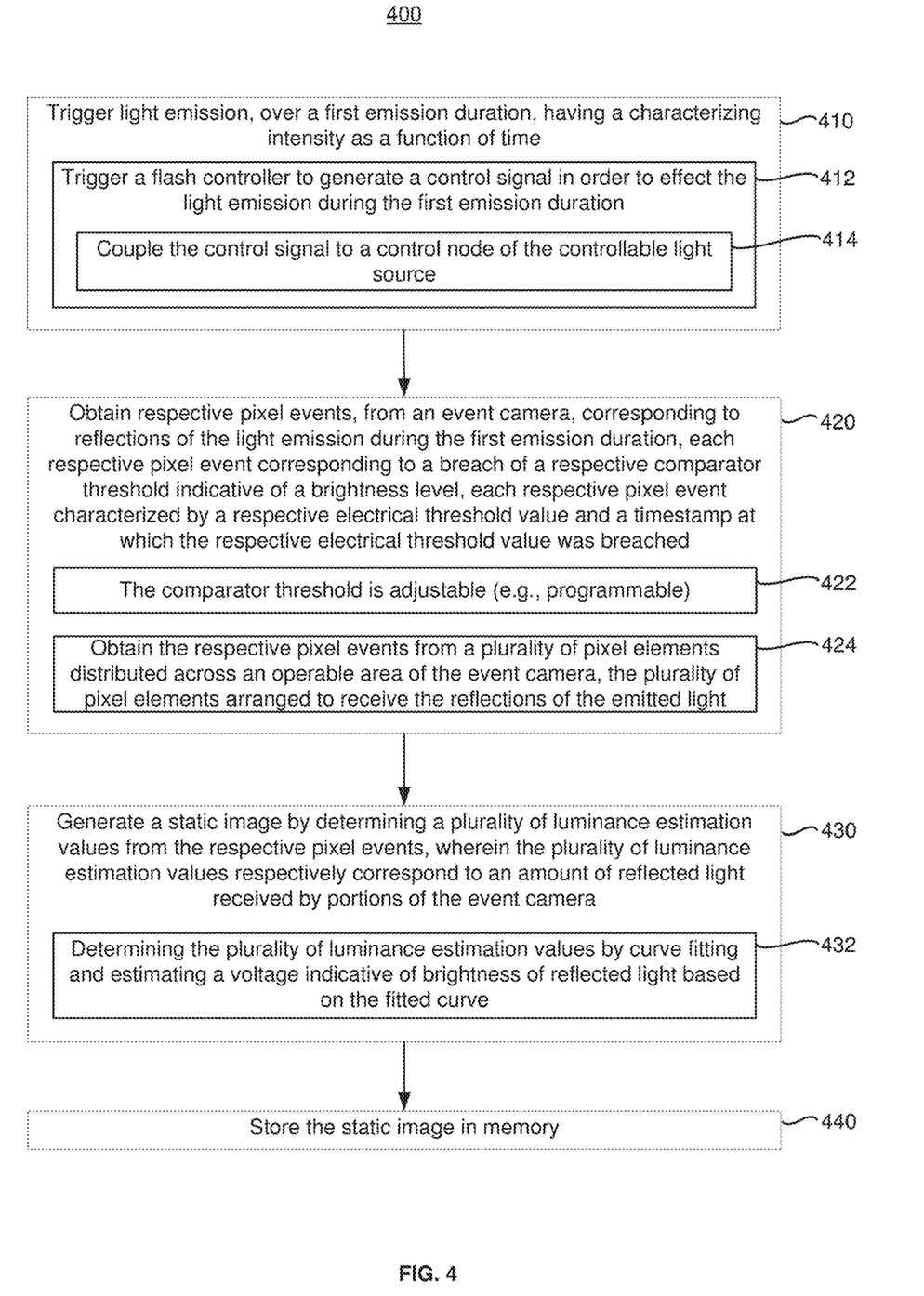
FIG. 4 is a flow diagram illustrating a method of generating static images, in accordance with some embodiments.

FIG. 4 is a flow diagram illustrating a method 400 of generating static images, in accordance with some embodiments. In some embodiments, the method 400 is performed at an image processing device (e.g., the electronic device 100 shown in FIGS. 1 and 3) with a processor (e.g., the processor 130 shown in FIG. 1) and a non-transitory memory (e.g., the memory 140 shown in FIGS. 1 and 3). In some embodiments, the image processing device further includes a flash controller (e.g., the flash controller 150 shown in FIGS. 1 and 3) connectable to a controllable light source (e.g., the controllable light source 160 shown in FIGS. 1 and 3). As described herein, in some embodiments, the flash controller provides a control signal (e.g., the control signal 152 shown in FIG. 3) to the controllable light source in order to drive the controllable light source to emit light (e.g., the light 164 shown in FIG. 3) over a first emission duration as a function of the control signal. In some embodiments, the image processing device further includes an event camera, which has a plurality of pixel elements (e.g., the event camera sensors 110 shown in FIGS. 1-3) distributed across a first area (e.g., the operable area inside the shaded area shown in FIG. 2, or a sub-portion of the operable area of the event camera) arranged to receive reflections of light.

In some embodiments, the method 400 is performed by processing logic, including hardware, firmware, software, or a combination thereof. In some embodiments, the method 400 is performed by a processor executing code (e.g., computer-readable instructions) stored in a non-transitory computer-readable medium (e.g., a memory).

Figure 6:
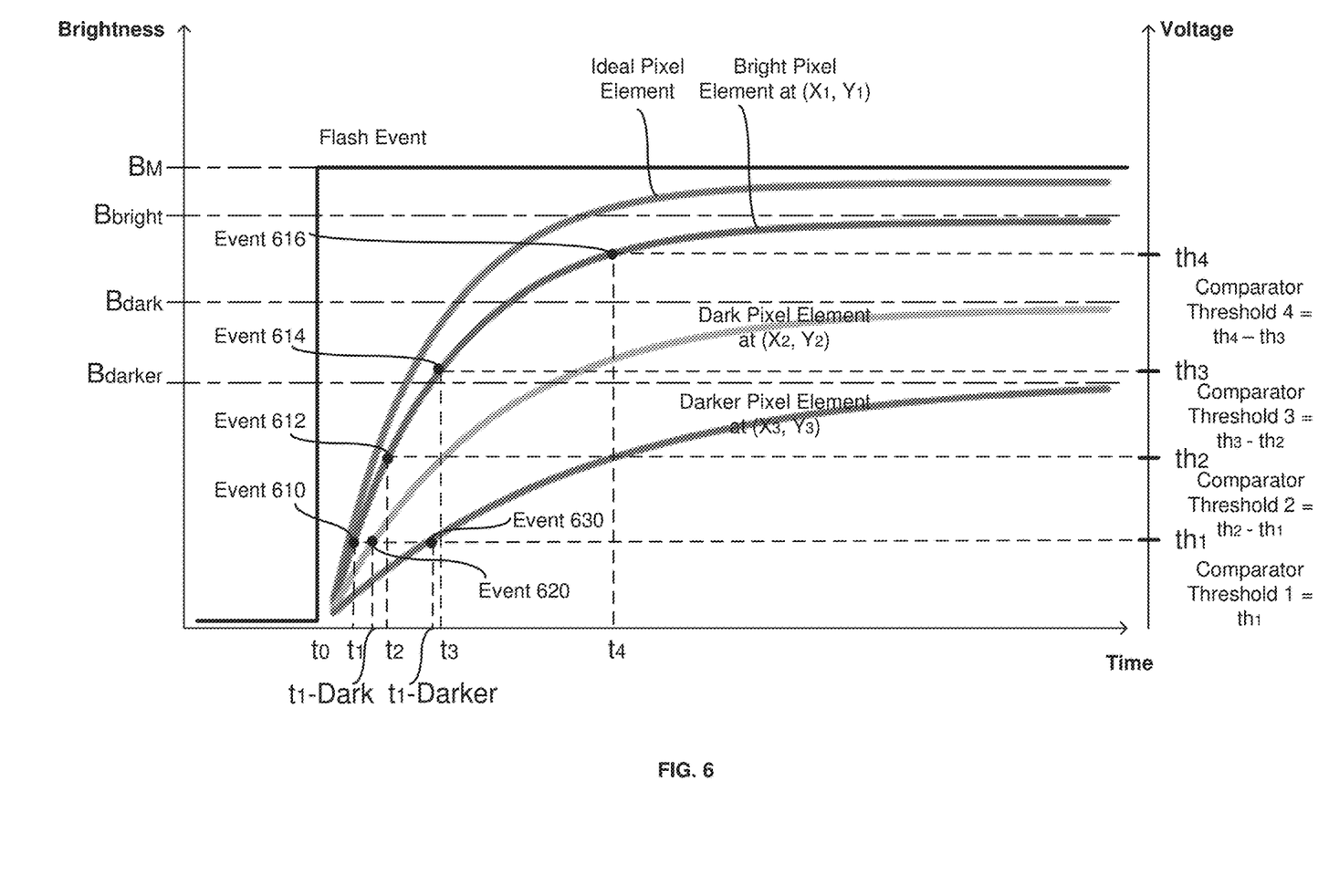
FIG. 6 illustrates exemplary luminance estimation curves in response to a flash event characterized by a step function, in accordance with some embodiments.
Figure 7:
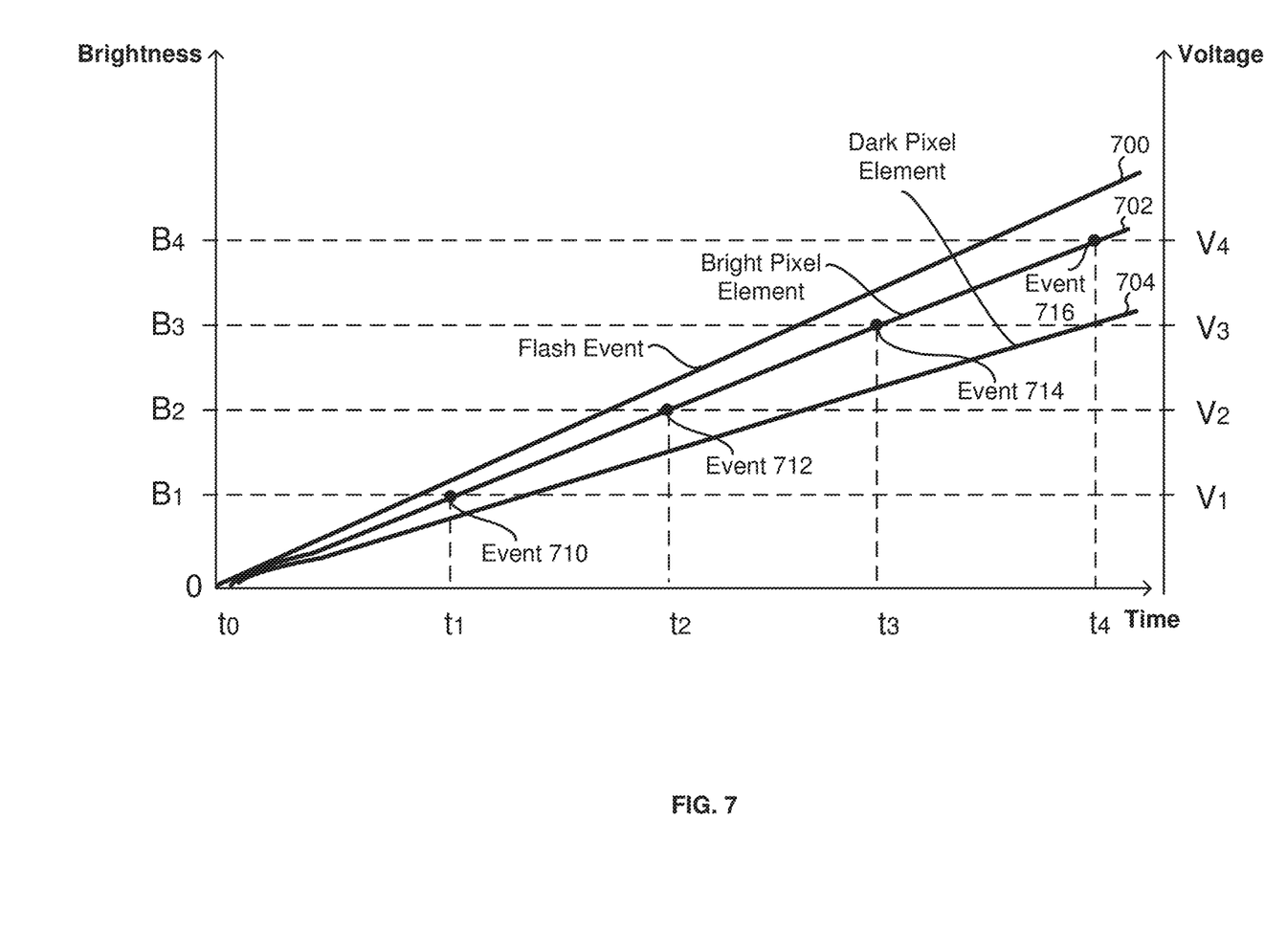
FIG. 7 illustrates exemplary luminance estimation curves in response to a flash event characterized by a ramp function, in accordance with some embodiments.

As represented by block 410, in some embodiments, the method 400 includes triggering light emission, over a first emission duration, having a characterizing intensity as a function of time. As represented by block 412, in some embodiments, the method 400 includes triggering light emission by triggering a flash controller (e.g., the flash controller 150 shown in FIGS. 1 and 3) to generate a control signal (e.g., the control signal 152 shown in FIG. 3) in order to effect the light emission (e.g., the light 164 shown in FIG. 3) during the first emission duration. As represented by block 414, in some embodiments, the method 400 includes coupling the control signal to a control node of the controllable light source (e.g., coupling the control signal 152 to the control node 162 of the controllable light source 160 shown in FIG. 3). For example, as described herein (e.g., in connection with FIG. 3), the flash controller 150 generates the control signal 152 and couples the control signal 152 to the control node 162 of the controllable light source 160 to trigger the light emission (e.g., the light 164). In some embodiments, the characterizing intensity of the light emission as a function of time is a step function during a period of time, e.g., a step shown in FIG. 6. In some embodiments, the characterizing intensity of the light emission as a function of time is a ramp function, e.g., the light intensity increases as a function of time as shown in FIG. 7.

As represented by block 420, in some embodiments, the method 400 includes obtaining respective pixel events corresponding to reflections of the light emission during the first emission duration (e.g., obtaining the events 314 shown in FIG. 3). In some embodiments, the method 400 includes obtaining the pixel events from an event camera (e.g., obtaining the pixel events from the event time recorder 312 and/or the event camera sensors 110 shown in FIG. 3). In some embodiments, each respective pixel event corresponds to a breach of a respective comparator threshold indicative of a brightness level. In some embodiments, each respective pixel event is characterized by a respective electrical threshold value and a timestamp at which the respective electrical threshold value was breached.

As represented by block 422, in some embodiments, the comparator threshold is adjustable. For example, in some embodiments, the comparator threshold is manually adjusted by an operator (e.g., a human operator). In some embodiments, the comparator threshold is programmatically adjusted (e.g., automatically adjusted) by a program (e.g., computer-readable instruction executed by a processor). As such, in some embodiments, the comparator threshold varies between events. In some embodiments, the comparator threshold is fixed (e.g., remains constant). For example, referring to FIG. 6, comparator threshold 2, which represents a difference between electrical threshold level values $th_1$ and $th_2$, is the same as comparator threshold 3, which represents a difference between electrical threshold level values $th_2$ and $th_3$. In the example of FIG. 6, comparator threshold 4, which represents a difference between electrical threshold level values $th_2$ and $th_3$, is different from comparator threshold 3 and comparator threshold 2.

As represented by block 424, in some embodiments, the method 400 includes obtaining the respective pixel events from a plurality of pixel elements distributed across an operable area (e.g., as shown in FIG. 2) of the event camera arranged to receive the reflections of the emitted light (e.g., as shown in FIG. 3). In some embodiments, obtaining the respective pixel events includes obtaining the respective pixel events from a sub-portion of the operable area of the event camera.

Figure 5:
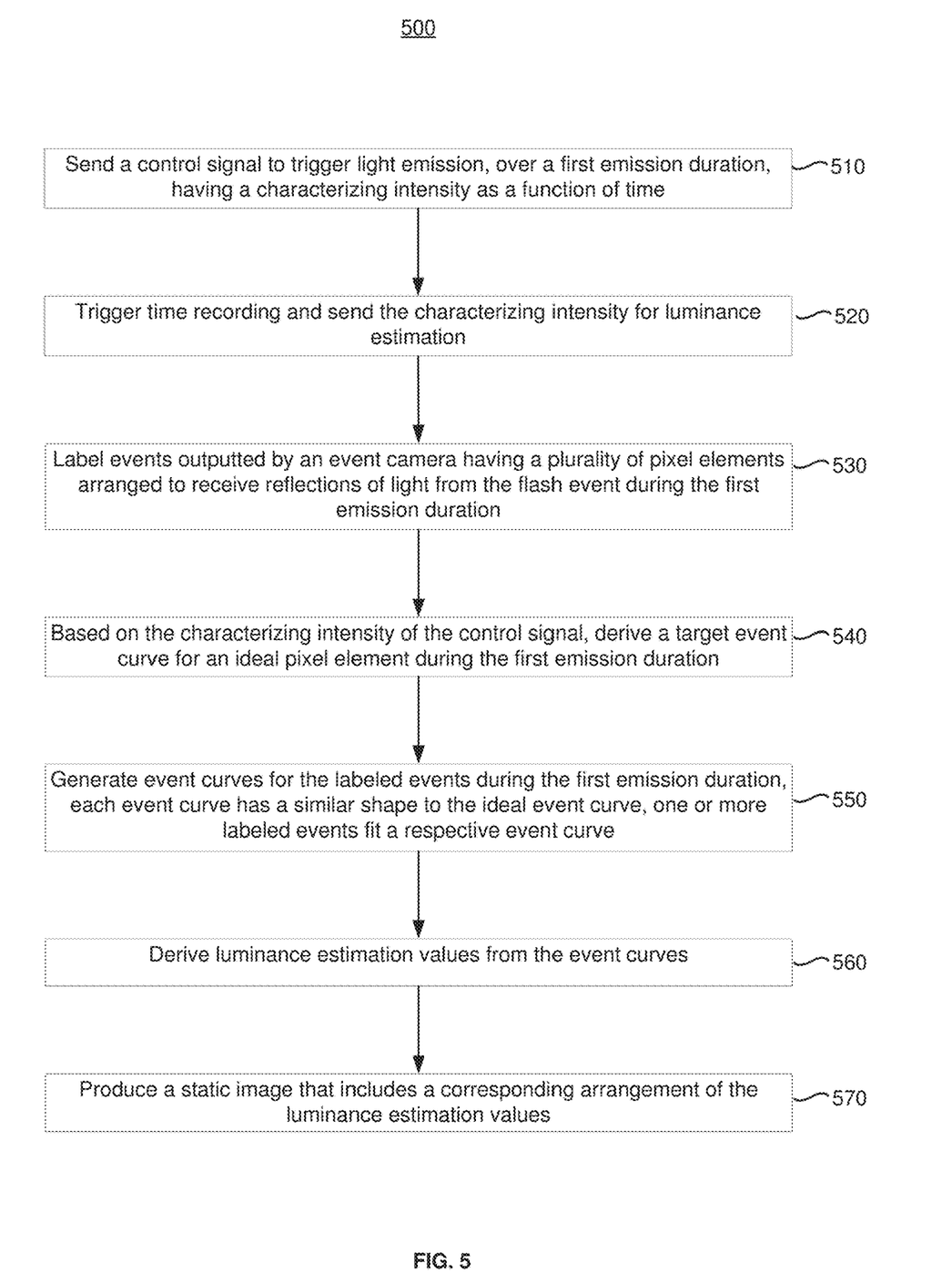
FIG. 5 is a flow diagram illustrating a method of deriving luminance estimation values for static images, in accordance with some embodiments.

As represented by block 430, in some embodiments, the method 400 includes generating a static image by determining a number of luminance estimation values from the respective pixel events. In some embodiments, the luminance estimation values respectively correspond to an amount of reflected light received by portions of the event camera. As represented by block 432, in some embodiments, the method 400 includes determining the luminance estimation values by curve fitting the pixel events and estimating a voltage indicative of brightness of reflected light based on the fitted curve. FIG. 5 illustrates an example of the curve fitting process. In some embodiments, the curves correlate the characterizing intensity of the light emission (e.g., as illustrated in FIGS. 6 and 7).

As represented by block 440, in some embodiments, the method 400 includes storing the static image(s) in memory (e.g., storing images in the image buffer 142 of memory 140 shown in FIG. 3, for example, storing the image data 1, image data 2 . . . image data N).

FIG. 5 is a flow diagram illustrating a method 500 of curve fitting pixel event(s) in order to derive luminance estimation value(s), in accordance with some embodiments. In some embodiments, the method 500 is performed at an image processing device (e.g., the electronic device 100 shown in FIGS. 1 and 3) with a processor (e.g., the processor 130 shown in FIG. 1) and non-transitory memory (e.g., the memory 140 shown in FIG. 1). In some embodiments, the image processing device further includes a flash controller (e.g., the flash controller 150 shown in FIGS. 1 and 3) connectable to a controllable light source (e.g., the controllable light source 160 shown in FIGS. 1 and 3). In some embodiments, the flash controller provides a control signal (e.g., the control signal 152 shown in FIG. 3) to the controllable light source in order to drive the controllable light source to emit light over a first emission duration as a function of the control signal. In some embodiments, the image processing device further includes an event camera, which has a number of pixel elements (e.g., the event camera sensors 110 shown in FIGS. 1-3) distributed across a first area (e.g., the operable area inside the shaded area shown in FIG. 2, or a sub-portion of the operable area of the event camera) arranged to receive reflections of light.

In some embodiments, the method 500 is performed by processing logic, including hardware, firmware, software, or a combination thereof. In some embodiments, the method 500 is performed by a processor executing code (e.g., computer-readable instructions) stored in a non-transitory computer-readable medium (e.g., a memory).

As represented by block 510, in some embodiments, the method 500 includes sending a control signal (e.g., the control signal 152 shown in FIG. 3) to a controllable light source (e.g., the controllable light source 160 shown in FIGS. 1 and 3) to trigger light emission (e.g., the light 164 shown in FIG. 3), over a first emission duration, having a characterizing intensity as a function of time. In some embodiments, the characterizing intensity of light emission as a function of time is a step function or a ramp function during a period of time, in accordance with some embodiments.

As represented by block 520, in some embodiments, the method 500 includes triggering time recording and sending the characterizing intensity for luminance estimation. For example, the flash controller 150 instructs the even recorder 1c (FIG. 2) to start recording time and sending the characterizing intensity of light emission (e.g., a step function or a ramp function) to the pixel luminance estimator 120, as shown in FIG. 3.

As represented by block 530, in some embodiments, the method 500 includes labeling events outputted by an event camera. As described herein, in some embodiments, the event camera includes pixel elements that are arranged to receive reflections of light from the light emission during the first emission duration. As described herein, in some embodiments, an event is generated when a comparator threshold is breached. In accordance with some embodiments, the event is characterized by a respective electrical voltage at the time of the breach, a timestamp of the breach (e.g., added by the event recorder 1c shown in FIG. 2), and a location of the pixel element (e.g., x-coordinate and y-coordinate in a two-dimensional pixel array as illustrated in FIG. 2).

Referring to FIG. 6, events 610, 620, and 630 are generated when the voltages in the circuits breach comparator threshold 1. Event 610 is detected by a pixel element at location $(X_1, Y_1)$ corresponding to a bright pixel (hereinafter "bright pixel element"), event 620 is detected by a pixel element at location $(X_2, Y_2)$ corresponding to a dark pixel (hereinafter "dark pixel element"), and event 630 is detected by a pixel element at location $(X_3, Y_3)$ corresponding to a darker pixel (hereinafter "darker pixel element"). At the time of the breach, e.g., $t_1$, $t_1$-Dark, and $t_1$-Darker, the electrical threshold value is $th_1$. In some embodiment, the events 610, 620, and 630 are represented by the following data:

$\{(t_1, (X_1, Y_1), th_1)$,
$(t_2, (X_2, Y_2), th_2)$,
$(t_3, (X_3, Y_3), th_3)\}$.

As shown in FIG. 6, relative to the bright pixel element, it takes longer for the dark pixel element circuit to accumulate charge in order to breach comparator threshold 1. Likewise, it takes even longer for the darker pixel element circuit to accumulate charge to breach comparator threshold 1, i.e., $t_1 < t_1$-Dark $< t_1$-Darker.

Referring back to FIG. 5, as represented by block 540, in some embodiments, based on the characterizing intensity of the control signal, the method 500 includes deriving a target event curve (e.g., an ideal event curve) for a target pixel element (e.g., an ideal pixel element) during the first emission duration. As used herein, a target pixel element captures most light reflection. The target event curve represents electrical levels outputted by the target pixel element as a function of time in response to light. As represented by block 550, in some embodiments, the method 500 includes generating similarly shaped event curves for the labeled events during the first emission duration by fitting one or more respective pixel events to the similarly shaped curves. As represented by block 560, in some embodiments, the method 500 includes determining luminance estimation values based on the event curves (e.g., deriving luminance estimation values from the event curves). As represented by block 570, in some embodiments, the method 500 include synthesizing (e.g., generating, for example, producing) a static image that includes a corresponding arrangement of the luminance estimation values.

For example, in FIG. 6, as the light bursts, in a circuit for a pixel element (e.g., the circuit 112 shown in FIG. 2), the capacitor C1 begins to accumulate charge, and the voltage measurement from capacitor C1 increases. In some embodiments, the instantaneous voltage across the capacitor versus time is a function of $(1-\exp^{t/\tau})$, where t is the lapsed time that the circuit voltages have been changing, and $\tau$ is the time constant of the circuit. In some embodiments, the method 500 includes generating a target event curve (e.g., an ideal event curve) based on the instantaneous voltage across the capacitor as a function of time.

In some embodiments, the method 500 includes generating other event curves based on the target event curve. In some embodiments, the other event curves have shapes that are similar shapes to the target event curve, e.g., as a function of $(1-\exp^{t/\tau})$. In some embodiments, the method 500 includes generating an event curve for a pixel element by fitting one or more data points representing the event(s) detected by the pixel element. For example, in FIG. 6, the curve for the bright pixel element is generated by fitting data point $(t_1, (X_1, Y_1), th_1)$ on a curve representing a function of $(1-\exp^{t/\tau})$. Similarly, the curves for the dark pixel element and darker pixel element are generated according to the function of $(1-\exp^{t/\tau})$ and by fitting data points $(t_2, (X_2, Y_2), th_2)$ and $(t_3, (X_3, Y_3), th_3)$ respectively.

In some embodiments, more than one comparator threshold is breached and more than one event is fitted on a curve in order to improve signal-to-noise ratio. For example, in FIG. 6, the curve corresponding to the bright pixel element indicates that the comparator thresholds are breached four times. In other words, after detecting event 610 at time $t_1$, the bright pixel element further detects event 612 at time $t_2$, event 614 at $t_3$, and event 616 at $t_4$. In some embodiments, the four events (e.g., events 610, 612, 614 and 616) are fitted on the bright pixel element curve to improve a signal-to-noise ratio.

In some embodiments, the method 500 includes, after generating curves for pixel elements, estimating an asymptotic limit of each curve (e.g., a steady state voltage). In some embodiments, for the target pixel element, the steady state voltage is approximately the same as the light emission voltage, indicating that the target pixel element detects an increased amount of reflected light, $B_M$ (e.g., a maximum amount of light). For the bright pixel element, the curve falls below the ideal curve. As such, in some embodiments, the asymptotic limit of the bright pixel element curve is lower than the asymptotic limit of the ideal curve, indicating a lesser brightness of reflected light, $B_{bright}$, being detected at location $(X_1, Y_1)$. Likewise, the lower asymptotic limits of the dark pixel element curve and darker pixel element curve indicate: $B_{darker}$ at location $(X_3, Y_3) < B_{dark}$ at location $(X_2, Y_2) < B^{bright}$ at location $(X_1, Y_1)$. In the example of FIG. 6, a static image is generated based on the corresponding arrangement of $B_{bright}$ at location $(X_1, Y_1)$, $B_{dark}$ at location $(X_2, Y_2)$, and Baker at location $(X_3, Y_3)$.

The example of FIG. 6 illustrates an electrical response to light emission that is characterized as a step function in accordance with some embodiments. In some embodiments, the characterizing intensity of the light emission is a ramp function, e.g., the light intensity increases over time. In such embodiments, the device fits a respective curve tracking the ramp function within a threshold accuracy criterion based on a function of one or more respective pixel events associated with a respective pixel element of the event camera, and synthesizes a respective luminance estimation value of the plurality of luminance estimation values based on the respective curve.

FIG. 7 illustrates a flash event line 700 corresponding to a flash event (e.g., a light emission) representing increasing light intensity as a function of time. The curves 702 and 704 for bright pixel element and dark pixel element, respectively, track the flash event line 700 within a threshold distance. In some embodiments, the curves 702 and 704 are generated, as described in connection with FIG. 6 above, by fitting data points representing events to the curves 702 and 704, e.g., by fitting data point(s) representing one or more events 710-716 to the curve 702 representing the bright pixel element. In some embodiments, a luminance estimation value is estimated from the curve 702, e.g., deriving brightness values $B_1$, $B_2$, $B_3$, and $B_4$ as a function of time.

Figure 8:
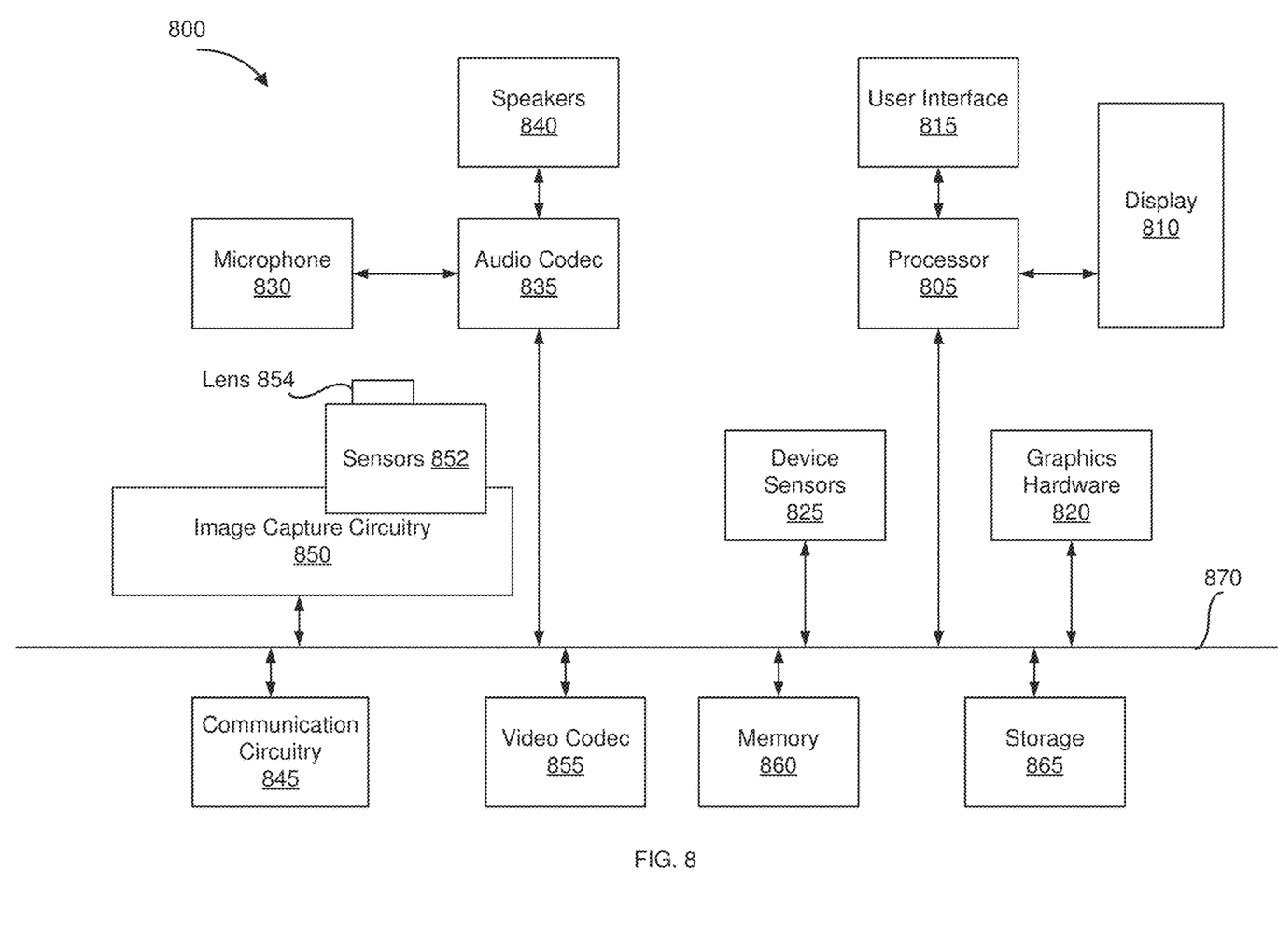
FIG. 8 is a block diagram illustrating an example multifunctional device, in accordance with some embodiments.

Referring now to FIG. 8, a functional block diagram of an example multifunction device 800 is shown in accordance with some embodiments. In some embodiments, multifunction electronic device 800 includes a processor 805, a display 810, a user interface 815, graphics hardware 820, device sensors 825 (e.g., proximity sensor/ambient light sensor, accelerometer and/or gyroscope), a microphone 830, audio codec(s) 835, speaker(s) 840, communications circuitry 845, digital image capture circuitry 850 (e.g., including camera system 100), video codec(s) 855 (e.g., in support of the digital image capture circuitry 850), a memory 860, storage 865, and communications bus 870. In some embodiments, the multifunction electronic device 800 is a digital camera or a personal electronic device, such as a personal digital assistant (PDA), personal music player, mobile telephone, or a tablet computer. In some embodiments, the multifunction electronic device 800 embodies the electronic device 100 shown in FIGS. 1 and 3. In some embodiments, the multifunction electronic device 800 performs the operations and/or methods described herein (e.g., the multifunction electronic device 800 performs the method 400 shown in FIG. 4 and/or the method 500 shown in FIG. 5).

In some embodiments, the processor 805 executes instructions necessary to carry out or control the operation of many functions performed by the device 800 (e.g., the generation and/or processing of images as disclosed herein). The processor 805, for instance, drives the display 810 and receives user input from the user interface 815. The user interface 815, in some embodiments, allows a user to interact with the device 800. For example, the user interface 815 includes a button, keypad, dial, a click wheel, keyboard, display screen and/or a touch screen. In some embodiments, the processor 805 includes a system-on-chip such as those found in mobile devices and include a dedicated graphics processing unit (GPU). In some embodiments, the processor 805 is based on reduced instruction-set computer (RISC) or complex instruction-set computer (CISC) architectures or any other suitable architecture and may include one or more processing cores. The graphics hardware 820 in some embodiments is a special purpose computational hardware for processing graphics and/or assisting the processor 805 to process graphics information. In some embodiment, the graphics hardware 820 includes a programmable GPU.

In some embodiments, through lens 854, the image capture circuitry 850 uses sensors (or pixel sensors, or sensor elements, or pixel elements) 852 to capture images and/or events. Output from the image capture circuitry 850 is processed, at least in part, by the video codec(s) 855 and/or the processor 805 and/or the graphics hardware 820, and/or a dedicated image processing unit or pipeline incorporated within the digital image capture circuitry 850. Images so captured are stored in the memory 860 and/or storage 865. In some embodiments, the image capture circuitry 850 and/or the sensors 852 include one or more event camera sensors (e.g., the event camera sensors 110 shown in FIGS. 1-3).

In some embodiments, the images captured by sensors 852 and the camera circuitry 850 are processed in accordance with the methods disclosed herein, at least in part, by video codec(s) 855 and/or processor 805 and/or graphics hardware 820, and/or a dedicated image processing unit incorporated within the circuitry 850. Images so captured and/or processed are stored in memory 860 and/or storage 865. The memory 860 includes one or more different types of media used by the processor 805 and graphics hardware 820 to perform device functions. For example, the memory 860 includes memory cache, read-only memory (ROM), and/or random access memory (RAM). In some embodiments, the storage 865 stores media (e.g., audio, images such as static images generated by the multifunction electronic device 800 based on data provided by an event camera, and video files), computer program instructions or software, preference information, device profile information, and any other suitable data. In some embodiments, the storage 865 includes one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). In some embodiments, the memory 860 and storage 865 are used to tangibly retain computer program instructions or code organized into one or more modules and written in any desired computer programming language. When executed by, for example, the processor 805, such computer program code is implement one or more of the methods described herein.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    at a device with a processor and non-transitory memory:
    receiving an illumination signal characterizing a change in illumination of a scene;
    obtaining, from an event camera, a plurality of events having a respective plurality of timestamps indicating a time at which a respective threshold value was breached;
    determining a plurality of luminance estimation values corresponding to an amount of light received by portions of the event camera by fitting the plurality of timestamps to curves based on the illumination signal; and
    generating a static image of the scene based on the plurality of luminance estimation values.

2. The method of claim 1, wherein each of the plurality of events further includes a threshold indicator indicating the respective threshold value.

3. The method of claim 1, wherein each of the plurality of events further includes a location indicator indicating a location of a pixel element of the event camera.

4. The method of claim 3, wherein generating the static image of the scene includes arranging the luminance estimation values based on the location indicators.

5. The method of claim 1, wherein the illumination signal is received from an ambient light sensor.

6. The method of claim 1, wherein the illumination signal characterizes a control signal provided to a controllable light source that emits light based on the control signal.

7. The method of claim 1, wherein the curves based on the illumination signal are similarly shaped.

8. The method of claim 1, wherein determining the plurality of luminance estimation values includes estimating respective asymptotic limits of the curves based on the illumination signal.

9. The method of claim 1, wherein the plurality of events includes a first event associated with a first pixel element of the event camera and a first respective threshold value and a second event associated with the first pixel element of the event camera and a second respective threshold value different than the first respective threshold value.

10. A device comprising:
an event camera to generate a plurality of events having a respective plurality of timestamps indicating a time at which a respective threshold value was breached; and
an image processor to:
receive an illumination signal characterizing a change in illumination of a scene;
determine a plurality of luminance estimation values corresponding to an amount of light received by portions of the event camera by fitting the plurality of timestamps to curves based on the illumination signal; and
generate a static image of the scene based on the plurality of luminance estimation values.

11. The device of claim 10, further comprising an ambient light sensor to generate the illumination signal.

12. The device of claim 10, further comprising a controllable light source that emits light based on a control signal characterized by the illumination signal.

13. The device of claim 10, wherein the curves based on the illumination signal are similarly shaped.

14. The device of claim 10, wherein the image processor is to determine the plurality of luminance estimation values by estimating respective asymptotic limits of the curves based on the illumination signal.

15. The device of claim 10, wherein the plurality of events includes a first event associated with a first pixel element of the event camera and a first respective threshold value and a second event associated with the first pixel element of the event camera and a second respective threshold value different than the first respective threshold value.

16. A non-transitory computer-readable storage medium having instructions stored thereon which, when executed by one or more processors of a device, cause the device to:
receive an illumination signal characterizing a change in illumination of a scene;
obtain, from an event camera, a plurality of events having a respective plurality of timestamps indicating a time at which a respective threshold value was breached;
determine a plurality of luminance estimation values corresponding to an amount of light received by portions of the event camera by fitting the plurality of timestamps to curves based on the illumination signal; and
generate a static image of the scene based on the plurality of luminance estimation values.

17. The non-transitory computer-readable storage medium of claim 16, wherein the illumination signal is received from an ambient light sensor.

18. The non-transitory computer-readable storage medium of claim 16, wherein the illumination signal characterizes a control signal provided to a controllable light source that emits light based on the control signal.

19. The non-transitory computer-readable storage medium of claim 16, wherein the curves based on the illumination signal are similarly shaped.

20. The non-transitory computer-readable storage medium of claim 16, wherein the instructions cause the device to determine the plurality of luminance estimation values by estimating respective asymptotic limits of the curves based on the illumination signal.

* * * * *